(12) United States Patent
Holman

(10) Patent No.: US 7,534,048 B2
(45) Date of Patent: May 19, 2009

(54) CENTER BEARING ASSEMBLY FOR ROTATABLY SUPPORTING A SHAFT AT VARYING ANGLES RELATIVE TO A SUPPORT SURFACE

(75) Inventor: James L. Holman, Wauseon, OH (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 273 days.

(21) Appl. No.: 11/322,163

(22) Filed: Dec. 29, 2005

(65) Prior Publication Data

US 2006/0147144 A1 Jul. 6, 2006

Related U.S. Application Data

(60) Provisional application No. 60/640,958, filed on Dec. 31, 2004.

(51) Int. Cl.
F16C 27/06 (2006.01)
F16C 25/06 (2006.01)

(52) U.S. Cl. .................. 384/537; 384/535; 384/584

(58) Field of Classification Search ......... 384/202–204, 384/221–222, 428, 441, 478, 558, 535–537, 384/562, 570
See application file for complete search history.

(56) References Cited

U.S. PATENT DOCUMENTS

| 786,315 | A | 4/1905 | Rogers |
| 870,945 | A | 11/1907 | Floyd |
| 889,704 | A | 6/1908 | Mair |
| 2,138,659 | A | 11/1938 | Kindig |
| 2,397,164 | A | 3/1946 | Shafer |
| 2,439,269 | A | 4/1948 | Shafer |
| 2,687,926 | A | 8/1954 | Gair el al. |
| 2,796,304 | A | 6/1957 | Downs |
| 3,001,841 | A | 9/1961 | Glavan et al. |
| 3,298,754 | A | 1/1967 | Riester |
| 3,639,015 | A * | 2/1972 | Maas .................. 384/536 |
| 4,463,993 | A * | 8/1984 | Brissette et al. ......... 384/536 |
| 4,542,996 | A * | 9/1985 | Brissette et al. ......... 384/536 |
| 4,571,098 | A | 2/1986 | Rudnik |
| 4,708,499 | A | 11/1987 | Loser et al. |
| 4,722,618 | A | 2/1988 | Matsumoto et al. |
| 5,161,903 | A * | 11/1992 | March .................. 384/536 |
| 5,829,892 | A | 11/1998 | Groves |
| 5,868,503 | A | 2/1999 | Bade |
| 5,971,622 | A * | 10/1999 | Akazawa ............... 384/558 |
| 6,379,048 | B1 | 4/2002 | Brissette |
| 7,097,363 | B2 * | 8/2006 | Ostrander et al. ........ 384/536 |
| 2003/0219183 | A1 | 11/2003 | Schuetz |

FOREIGN PATENT DOCUMENTS

| JP | 2000079827 A | * | 3/2000 |
| JP | 2003112533 A | * | 4/2003 |

* cited by examiner

*Primary Examiner*—Marcus Charles
(74) *Attorney, Agent, or Firm*—Marshall & Melhorn, LLC

(57) ABSTRACT

A center bearing assembly for rotatably supporting a shaft at varying angles relative to a support surface includes a bearing and a bearing support member that supports the bearing. The bearing support member has a curved outer surface. A bracket is provided for supporting the bearing support member. The bracket has a curved inner surface that cooperates with the curved outer surface of the bearing support member to allow the bearing support member to move relative to the bracket.

18 Claims, 5 Drawing Sheets

CENTER BEARING ASSEMBLY FOR ROTATABLY SUPPORTING A SHAFT AT VARYING ANGLES RELATIVE TO A SUPPORT SURFACE

CROSS-REFERENCE TO RELATED APPLICATIONS

This application claims the benefit of U.S. Provisional Application No. 60/640,958, filed Dec. 31, 2004, the disclosure of which is incorporated herein by reference.

BACKGROUND OF THE INVENTION

This invention relates in general to bearings for supporting shafts for rotation. In particular, this invention relates to an improved structure for a center bearing assembly for rotatably supporting a shaft at varying angles relative to a support surface.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

In some vehicles, the distance separating the engine/transmission assembly and the axle assembly is relatively short. For these vehicles, the driveshaft assembly can be formed from a single, relatively long driveshaft tube having the first and second end fittings secured to the ends thereof. In other vehicles, however, the distance separating the engine/transmission assembly and the axle assembly is relatively long, making the use of a single driveshaft tube impractical. For these vehicles, the driveshaft assembly can be formed from a plurality of (typically two) separate, relatively short driveshaft sections. In a compound driveshaft assembly such as this, a first end of the first driveshaft section is connected to the output shaft of the engine/transmission assembly by a first universal joint, a second end of the first driveshaft section is connected to a first end of the second driveshaft section by a second universal joint, and a second end of the second driveshaft section is connected to the input shaft of the axle assembly by a third universal joint.

A compound driveshaft assembly that is composed of two or more separate driveshaft sections usually requires the use of a structure for supporting the intermediate portions thereof for rotation during use. A typical intermediate support structure for a driveshaft assembly (which is commonly referred to as a center bearing assembly) includes an annular bearing having an inner race that engages one of the driveshaft sections and an outer race that supports the inner race for rotation relative thereto. The outer race of the annular bearing is supported within a generally annular support member that is usually formed from a relatively resilient material, such as rubber. The resilient support member is, in turn, supported within a rigid bracket that is secured to a support surface provided on the vehicle. Thus, the center bearing assembly functions to support the intermediate portion of the driveshaft assembly for rotation during use. Many center bearing assembly structures of this general type are known in the art.

Traditional center bearing assemblies have been designed to rotatably support the driveshaft section in a single predetermined angular orientation relative to the rigid bracket and, thus, relative to the support surface provided on the vehicle. However, because the sizes and shapes of vehicles can vary widely, the normal angular orientation of the driveshaft section relative to the support surface can differ from vehicle to vehicle. To a limited extent, such variations in angular orientation can be accommodated by the inherent flexibility of the elastomeric support. However, in more extreme situations, such flexing of the elastomeric support is undesirable. As a result, it is known to provide a plurality of differently shaped mounting brackets that respectively support the driveshaft section in a plurality of different angular orientations relative to the support surface provided on the vehicle. Although effective, the provision for such a plurality of differently shaped mounting brackets for a variety of vehicles is inefficient. Thus, it would be desirable to provide an improved structure for a center bearing assembly that is capable of rotatably supporting a shaft at varying angles relative to a support surface without the use of a plurality of differently shaped mounting brackets.

SUMMARY OF THE INVENTION

This invention relates to an improved structure for a center bearing assembly for rotatably supporting a shaft at varying angles relative to a support surface. The center bearing assembly includes a bearing and a bearing support member that supports the bearing. The bearing support member has a curved outer surface. A bracket is provided for supporting the bearing support member. The bracket has a curved inner surface that cooperates with the curved outer surface of the bearing support member to allow the bearing support member to move relative to the bracket.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
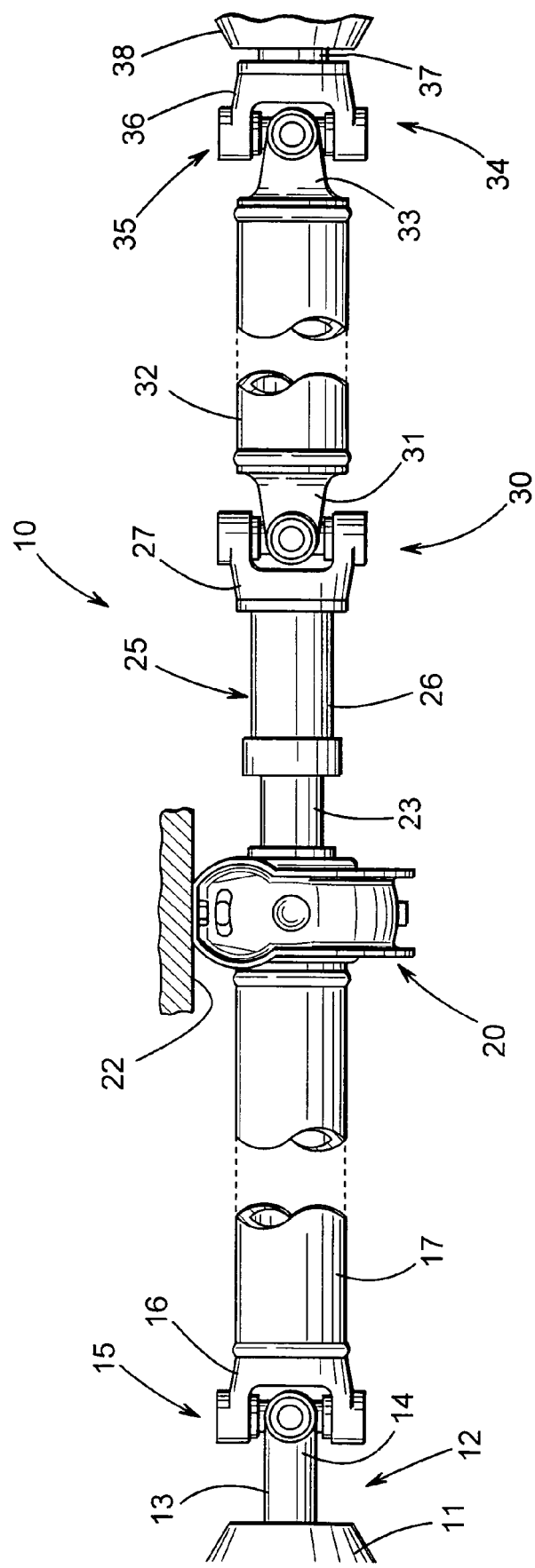
FIG. 1 is a side elevational view of a drive train system including a first embodiment of a center bearing assembly secured to a support surface in accordance with this invention.

Referring now to the drawings, there is illustrated in FIG. 1 a drive train system, indicated generally at 10, in accordance with this invention. The illustrated drive train system 10 is, in large measure, conventional in the art and is intended merely to illustrate one environment in which this invention may be used. Thus, the scope of this invention is not intended to be limited for use with the specific structure for the drive train system 10 illustrated in FIG. 1 or with drive train systems in general. On the contrary, as will become apparent below, this invention may be used in any desired environment for the purposes described below.

The illustrated vehicle drive train system 10 is adapted to transmit rotational power from a source, such as an engine/transmission assembly 11 to a driven device, such as a plurality of driven wheels (not shown). The engine/transmission assembly 11 is conventional in the art and includes an externally splined output shaft (not shown) that is connected to a first slip yoke, indicated generally at 12. The first slip yoke 12 is conventional in the art and includes an end portion 13 having a smooth cylindrical outer surface and an internally splined inner surface. The internally splined inner surface of the end portion 13 of the first slip yoke 12 engages the externally splined output shaft of the engine/transmission assembly 11 in a known manner. As a result, the first slip yoke 12 is rotatably driven by the output shaft of the engine/transmission assembly 11, but is free to move axially relative thereto to a limited extent.

The first slip yoke 12 further includes a yoke portion 14 that forms one part of a first universal joint assembly, indicated generally at 15. The first universal joint assembly 15 is also conventional in the art and includes a tube yoke 16 that is connected to the yoke portion 14 of the first slip yoke 12 by a cross in a known manner. The tube yoke 16 is secured, such as by welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of angular misalignment therebetween.

The first driveshaft section 17 extends through and is supported for rotation by a first embodiment of a center bearing assembly, indicated generally at 20. The structure of the first embodiment of the center bearing assembly will be explained in detail below. The first embodiment of the center bearing assembly 20 is secured to a support surface 22, such as a portion of a frame, chassis, or body of the vehicle. The first driveshaft section 17 has a second end 23 that, in the illustrated embodiment, is reduced in diameter relative to the first end of the first driveshaft section 17, although such is not necessary. The reduced diameter end 23 can be formed as a separate structure that is welded onto the larger diameter first end of the first drive shaft section 17. In any event, a portion of the outer surface of the reduced diameter second end 23 of the first driveshaft section 17 is formed having a plurality of external splines (not shown).

A second slip yoke, indicated generally at 25, is connected, such as by welding, to the reduced diameter second end 23 of the first driveshaft section 17 for rotation therewith. The second slip yoke 25 is conventional in the art and includes an end portion 26 having an internally splined inner surface (not shown). The internally splined inner surface of the end portion 26 of the second slip yoke 25 engages the externally splined portion of the second end 23 of the first driveshaft section 17 in a known manner. As a result, the second slip yoke 25 is rotatably driven by the first driveshaft section 17, but is free to move axially relative thereto to a limited extent.

The second slip yoke 25 further includes a yoke portion 27 that forms one part of a second universal joint assembly, indicated generally at 30. The second universal joint assembly 30 is also conventional in the art and includes a tube yoke 31 that is connected to the yoke portion 27 of the second slip yoke 25 by a cross in a known manner. The tube yoke 31 is secured, such as by welding, to a first end of a second driveshaft section 32 for rotation therewith. The second universal joint assembly 30 thus provides a rotational driving connection between the second end 23 of the first driveshaft section 17 and the first end of the second driveshaft section 32, while permitting a limited amount of angular misalignment therebetween.

The second end of the second driveshaft section 32 is secured, such as by welding to a tube yoke 33 that forms one part of a third universal joint assembly, indicated generally at 34. The third universal joint assembly 34 is also conventional in the art and includes a third slip yoke, indicated generally at 35. The third slip yoke 35 is conventional in the art and includes a yoke portion 36 that is connected to the tube yoke 33 by a cross in a known manner. The third slip yoke 35 further includes an end portion 37 having a smooth cylindrical outer surface and an internally splined inner surface (not shown). The internally splined inner surface of the end portion 37 of the third slip yoke 12 engages an externally splined input shaft (not shown) of a conventional axle assembly 38 that is connected to the plurality of driven wheels of the vehicle in a known manner. As a result, the input shaft of the axle assembly 38 is rotatably driven by the second driveshaft section 32, but is free to move axially relative thereto to a limited extent.

Figure 2:
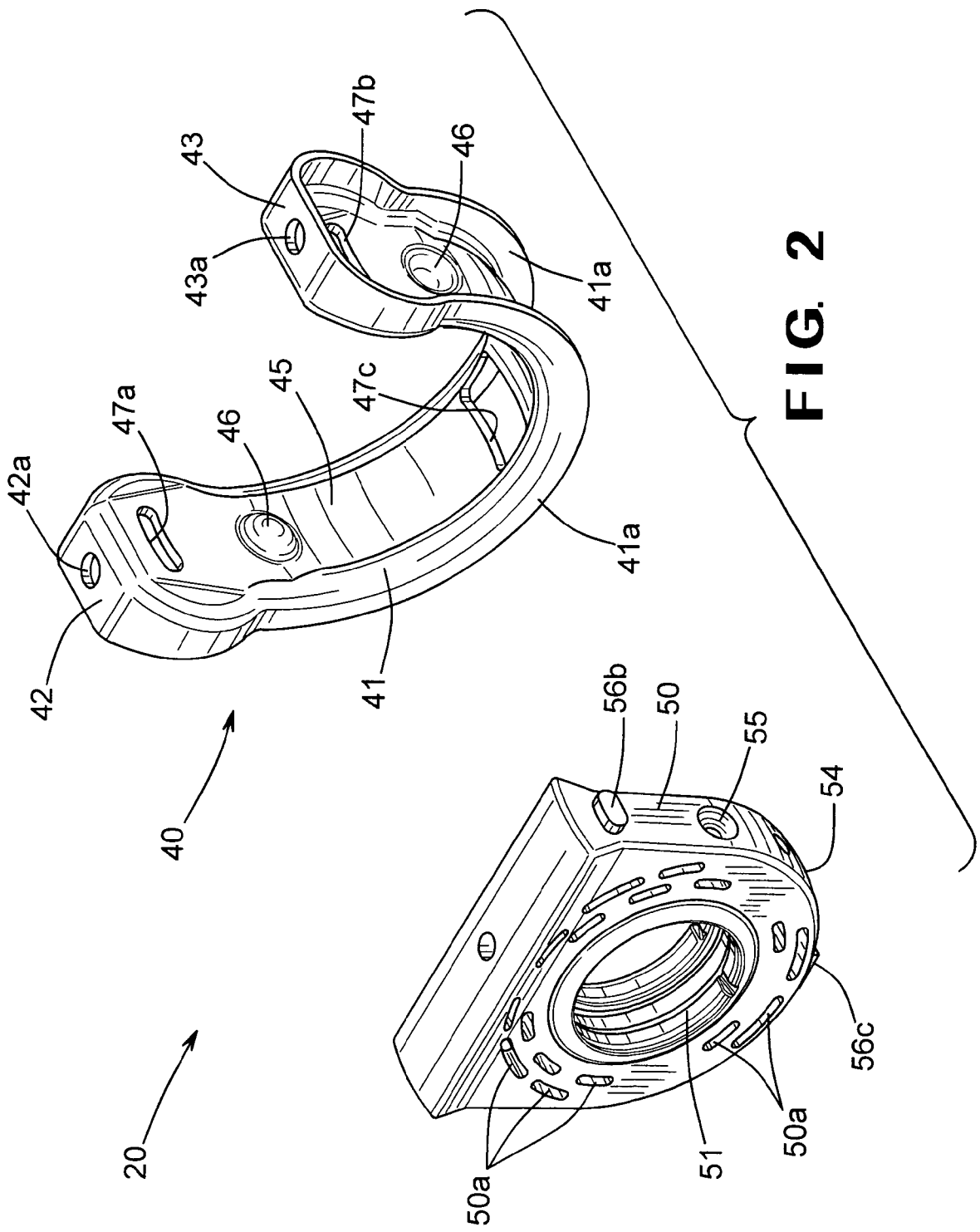
FIG. 2 is an exploded perspective view of a portion of the first embodiment of the center bearing assembly illustrated in FIG. 1.
Figure 3:
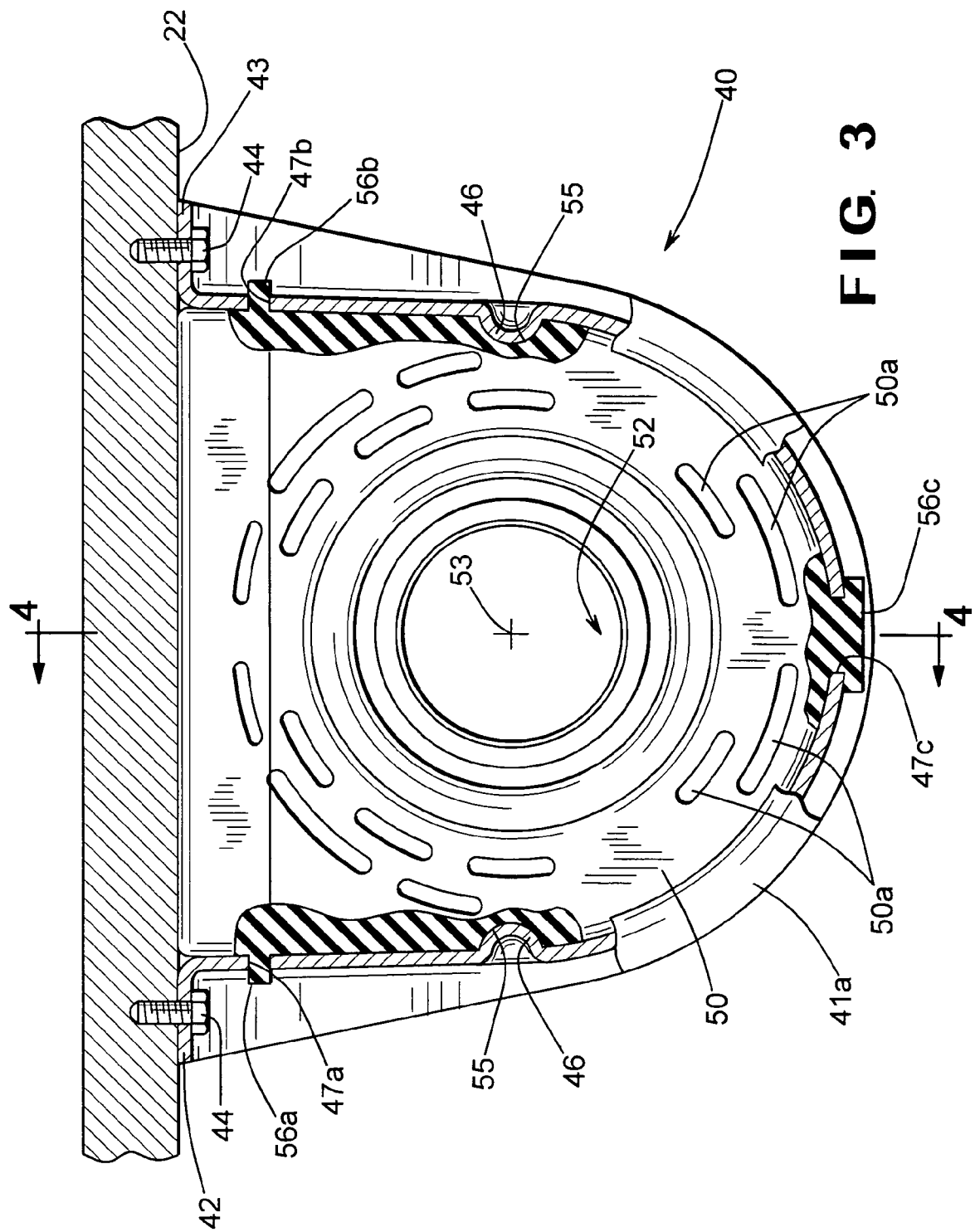
FIG. 3 is an end elevational view, partially in cross section, of the first embodiment of the center bearing assembly illustrated in FIG. 1 shown assembled and secured to the support surface.
Figure 4:
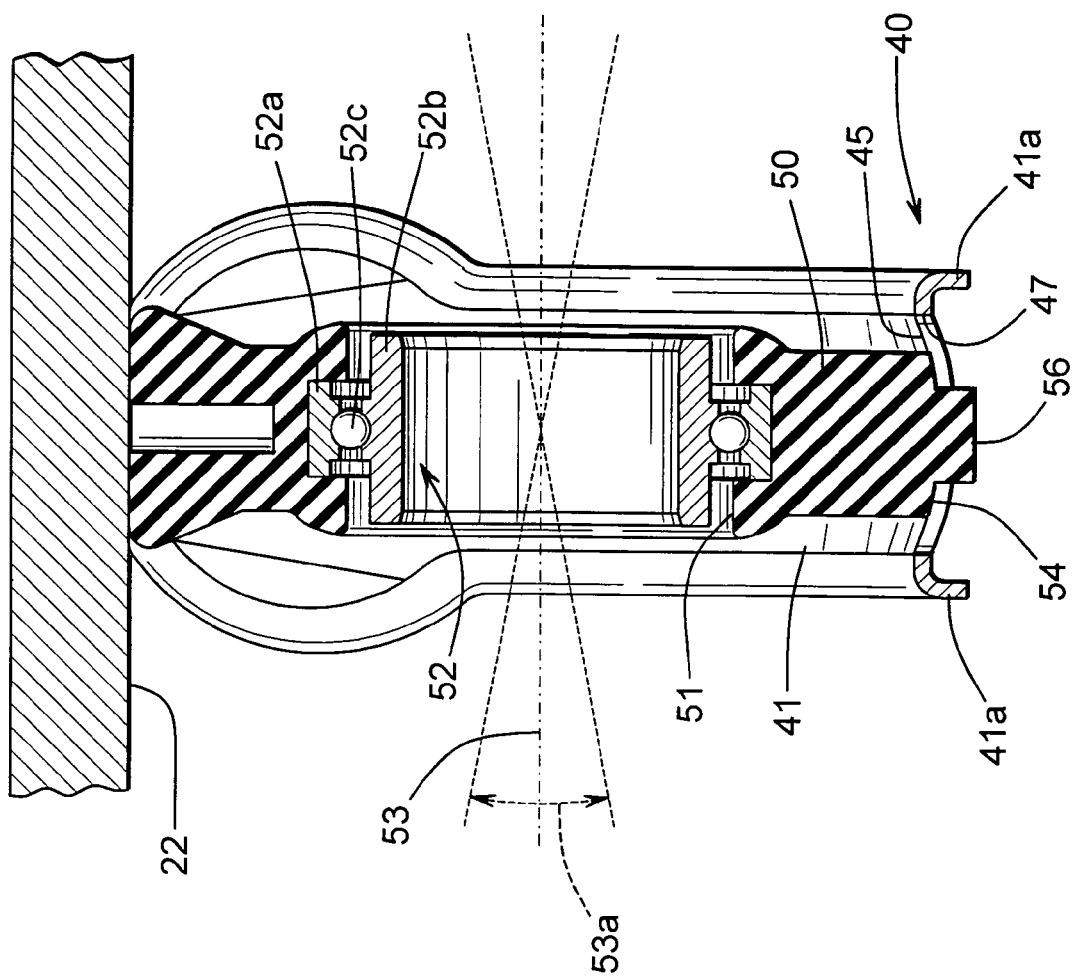
FIG. 4 is a sectional elevational view of the first embodiment of the center bearing assembly taken along line 4-4 of FIG. 3.

Referring now to FIGS. 2, 3, and 4, the structure of the first embodiment of the center bearing assembly 20 is illustrated in detail. As shown therein, the first embodiment of the center bearing assembly 20 includes a rigid bracket, indicated generally at 40, that is secured to the support surface 22 of the vehicle. Typically, the bracket 40 includes a generally U-shaped body portion 41 having a pair of flange portions 42 and 43 extending outwardly from the ends thereof. The flange portions 42 and 43 have respective apertures 42a and 43a formed therethrough. Such apertures 42a and 43a allow respective threaded fasteners 44 (see FIG. 3) to extend through the flanges 42 and 43 to secure the bracket 40 to the support surface 22 of the vehicle in a conventional manner. If desired, the body portion 41 of the bracket 40 can be provided with a pair of opposed rims or flanges 41a to increase the strength and rigidity thereof.

The body portion 41 of the bracket 40 has a curved inner surface 45 provided thereon. The curved inner surface 45 is preferably generally spherical in shape throughout the extent of the body portion 41 of the bracket 40 In other words, the curved inner surface 45 is curved relative to multiple axes of rotational movement. However, the curved inner surface 45 may be formed having any desired shape. The purpose for the curved inner surface 45 of the body portion 41 of the bracket 40 will be explained further below.

The body portion 41 of the bracket 40 also has a pair of protrusions 46 formed thereon. The illustrated protrusions 46 are provided on the opposed sides of the U-shaped body portion 41, although such protrusions 46 may be provided at any desired location or locations. The illustrated protrusions 46 are formed integrally with the body portion 41 of the bracket 40 and are generally semi-spherical in shape. However, the protrusions 46 may be provided on the bracket 40 in any desired manner and may have any desired shape or shapes. The purpose for the protrusions 46 will be explained below.

The body portion 41 of the illustrated bracket 40 further has a plurality of slots 47a, 47b, and 47c formed therethrough. In the illustrated embodiment, the first and second slots 47a and 47b are provided on the opposed sides of the U-shaped body portion 41, while the third slot 47c is provided at the bottom of the U-shaped body portion 41. However, such slots 47a, 47b, and 47c may be provided on the bracket 40 at any desired locations. The first and second slots 47a and 47b are generally arcuate in shape, while the third slot 47 is generally linear in shape. However, the slots 47a, 47b, and 47c may have any desired shapes. The purpose for the slots 47a, 47b, and 47c will also be explained below.

The first embodiment of the center bearing assembly 20 also includes a bearing support member 50 that is supported on the rigid bracket 40. The illustrated bearing support member 50 is generally annular in shape and is preferably formed from a resilient material, such as a conventional elastomeric material (such as rubber, for example) of the type that is typically used in conventional center bearing assemblies. However, the bearing support member 50 may be formed having any desired shape and may be formed from any desired material. The bearing support member 50 has an axially extending opening 51 formed therethrough, for a purpose that will be explained below. A plurality of slots 50a may be formed in or through portions of the bearing support member 50. The slots 50a are conventional in the art and are preferably generally arcuate in shape and arranged in two concentric circular arrays about the opening 51. Also, the slots 50a are preferably radially and circumferentially staggered throughout the bearing support member 50. However, the slots 50a can be provided in any desired number and location in the bearing support member 50 and can, if desired, be completely omitted. The slots 50a provide an added measure of flexibility to the elastomeric bearing support member 50.

An annular bearing assembly, indicated generally at 52 in FIGS. 3 and 4, is supported within the opening 51 formed through the bearing support member 50. The bearing assembly 52 is conventional in the art and is provided to rotatably support the first driveshaft section 17 about an axis of rotation 53 in the manner that is described further below. To accomplish this, the bearing assembly 52 includes an outer race 52a that is supported on the bearing support member 50, an inner race 52b that engages the outer surface of the first driveshaft section 17, and a plurality of balls 52c disposed between the outer race 52a and the inner race 52b so that the inner race 52a is supported for rotation relative to the outer race 52b. In this manner, the first driveshaft section 17 is supported for rotation by the first embodiment of the center bearing assembly 20.

The bearing support member 50 has a curved outer surface 54 provided thereon. The curved outer surface 54 is preferably generally spherical in shape throughout the extent of the bearing support member 50. In other words, the curved outer surface 54 is curved relative to multiple axes of rotational movement. However, the curved outer surface 54 may be formed having any desired shape. Preferably, the curved outer surface 54 of the bearing support member 50 corresponds generally in shape with the curved inner surface 45 provided on the body portion 41 of the bracket 40. The purpose for the curved outer surface 54 of the bearing support member 50 will be explained further below.

The bearing support member 50 also has a pair of recesses 55 formed therein. The illustrated recesses 55 are provided on the opposed sides of the bearing support member 50, although such recesses 55 may be provided at any desired location or locations. The illustrated recesses 55 are generally semi-spherical in shape. However, the recesses 55 may have any desired shape or shapes. The purpose for the recesses 55 will be explained below. The bearing support member 50 further has a plurality of retainers 56a, 56b, and 56c formed thereon. The first and second retainers 56a and 56b are provided on the opposed sides of the bearing support member 50, while the third retainer 56c is provided at the bottom of the outer spherical surface 54 of the bearing support member 50. However, such retainers 56a, 56b, and 56c may be provided at any desired locations on the bearing support member 50. The first and second retainers 56a and 56b are generally arcuate in shape, while the third retainer 56c is generally linear in shape. However, the retainers 56a, 56b, and 56c may have any desired shapes. The purpose for the retainers 56a, 56b, and 56c will also be explained below.

To assemble the first embodiment of the center bearing assembly 20, the bearing support member 50 is disposed within the body portion 41 of the bracket 40. When so disposed, the curved outer surface 54 of the bearing support member 46 abuts the curved inner surface 45 of the body portion 41 of the bracket 40, as shown in FIGS. 3 and 4. Also, the protrusions 46 provided on the body portion 41 of the bracket 40 are received within the recesses 55 provided on the bearing support member 50. Furthermore, the slots 47a, 47b, and 47c provided on the body portion 41 of the bracket 40 respectively receive the retainers 56a, 56b, and 56c provided on the bearing support member 50 therein. The opposed retainers 56a and 56b are preferably received within the associated opposed slots 47a and 47b with clearance therebetween, although such is not required. However, the retainer 56c provided on the bottom of the bearing support member 50 has a pair of laterally extending lips that are preferably received within the associated slot 47c provided on the body portion 41 of the bracket 40 in a snap fit relationship, although again such is not required.

The cooperation of the recesses 55 provided on the bearing support member 50 and the protrusions 46 provided on the body portion 41 of the bracket 40 defines the axis about which the bearing support member 50 can pivot relative to the bracket 40. Thus, the bearing support member 50 can pivot relative to the bracket 40 throughout an angle 53a illustrated in FIG. 4. This angle can be any desired angle, but preferably is in the range of about ten degrees plus or minus relative to the original axis of rotation 53. The cooperation of the curved outer surface 54 of the bearing support member 46 with the curved inner surface 45 of the body portion 41 of the bracket 40 provides for secure and continuous support of the bearing support member 46 on the bracket 40 regardless of the relative angular orientation therebetween. Lastly, the cooperation of the retainers 56a, 56b, and 56c with the slots 47a, 47b, and 47c prevent the bearing support member 46 from being inadvertently removed from the bracket 40. The cooperation of the retainers 56a, 56b, and 56c with the slots 47a, 47b, and 47c also limits the amount that the bearing support member 46 can pivot relative to the bracket 40.

In use, the bearing support member 50 and the bracket 40 of the center bearing assembly 20 are initially assembled as described above. When so assembled, the retainers 56a, 56b, and 56c cooperate with the slots 47a, 47b, and 47c to prevent the bearing support member 46 from being inadvertently removed from the bracket 40. The center bearing assembly 20 is then installed on the first driveshaft section 17, and the remainder of the driveshaft assembly (including some or all of the first universal joint 15, the first driveshaft section 17, the center bearing assembly 20, the second universal joint 30, the second driveshaft section 32, and the third universal joint 34) of the drive train system 10 is assembled in a conventional manner. It is common for the driveshaft portion of the drive train system 10 to be assembled in a first location, then shipped to a second location for installation on a vehicle or other device. During this shipment, the retainers 56a, 56b, and 56c continue to cooperate with the slots 47a, 47b, and 47c to prevent the bearing support member 46 from being inadvertently removed from the bracket 40. When the driveshaft assembly is installed on the vehicle, the angular orientation of the bearing support member 46 can be preliminarily adjusted relative to the bracket 40 in accordance with the specific requirements of the particular vehicle or other device upon which the drive train system 10 is to be used. As a result, it is not necessary to provide a plurality of differently shaped mounting brackets to allow a single center bearing assembly design to be used on a plurality of different vehicles. Once the bracket 40 of the center bearing assembly 20 is secured to the support surface 22 by the threaded fasteners 44, the bearing support member 46 is preferably frictionally retained in position relative to the bracket 40 for use. Alternatively, the bearing support member 46 may be supported on the bracket 40 so as to be movable relative thereto during operation of the drive train system 10.

As discussed above, the protrusions 46 provided on the body portion 41 of the bracket 40 cooperate with the recesses 55 provided on the bearing support member 50 to define the axis about which the bearing support member 50 can pivot relative to the bracket 40. This invention contemplates an alternative arrangement wherein protrusions (not shown) provided on the bearing support member 50 cooperate with recesses (not shown) provided on the body portion 41 of the bracket 40 to define the axis about which the bearing support member 50 can pivot relative to the bracket 40. Thus, as used herein, the terms "protrusions 46" and "recesses 55" should be interpreted to include this alternative structure.

If desired, the shape of the curved inner surface 45 of the body portion 41 of the bracket 40 need not correspond generally in shape with the curved outer surface 54 of the bearing support member 50, as described above. Rather, the shapes of the curved inner surface 45 of the body portion 41 of the bracket 40 and the curved outer surface 54 of the bearing support member 50 may differ. For example, the radius of curvature of the curved inner surface 45 of the body portion 41 of the bracket 40 may vary relative to the radius of curvature of the curved outer surface 54 of the bearing support member 50. The use of such differently shaped curved surfaces 45 and 54 can have the effect of providing more or less dampening of vibration of the center bearing assembly 20 in accordance with the amount of angular movement of the bearing support member 50 relative to the bracket 40.

Figure 5:
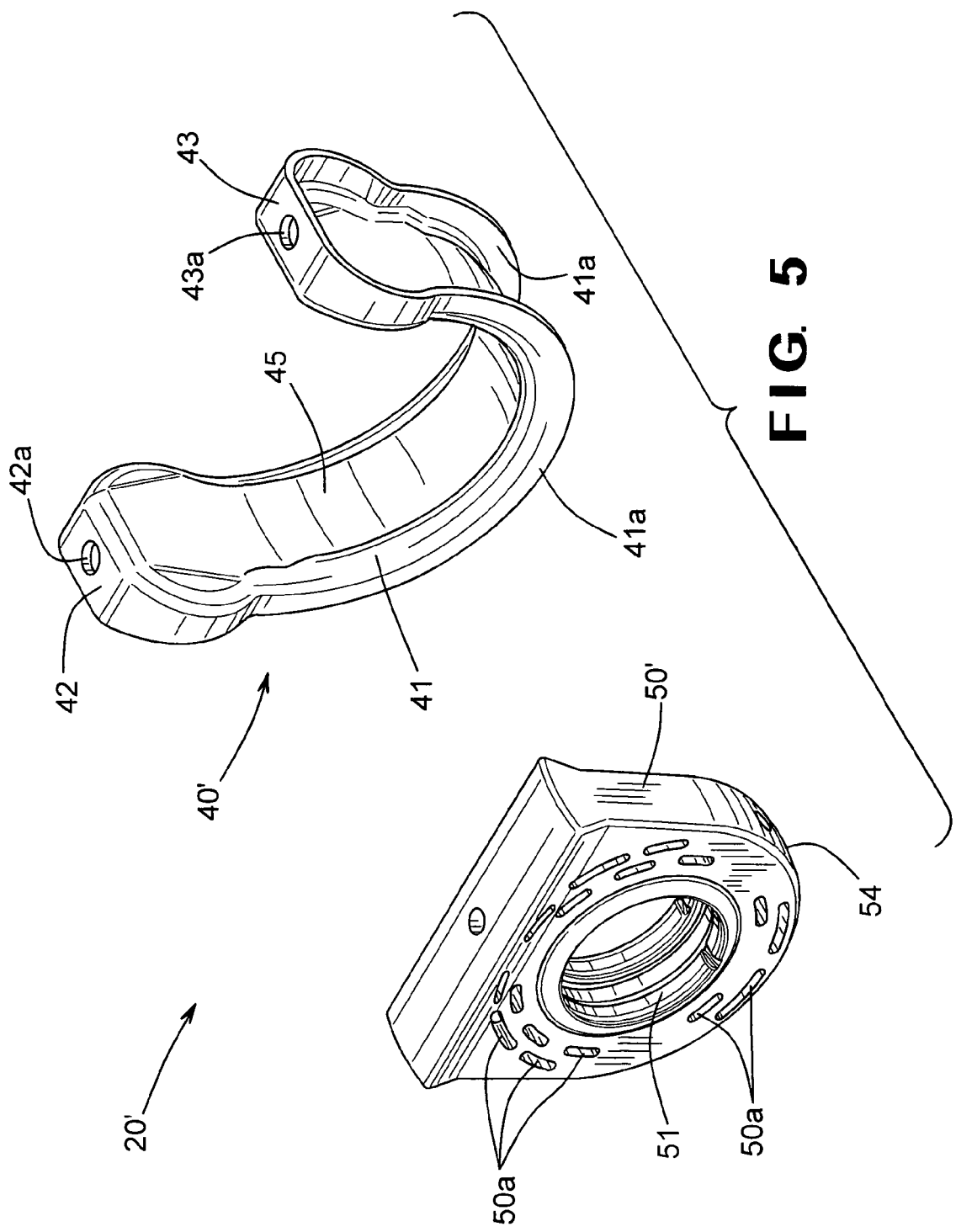
FIG. 5 is an exploded perspective view similar to FIG. 2 of a portion of a second embodiment of the center bearing assembly in accordance with this invention.

FIG. 5 illustrates a second embodiment of a center bearing assembly, indicated generally at 20', in accordance with this invention. The second embodiment of the center bearing assembly 20' is, in large measure, similar to the first embodiment of the center bearing assembly 20 described above, and like reference numbers are used to identify similar structures. In this embodiment, a modified bracket 40' is provided that does not include any of the protrusions 46 or the slots 47a, 47b, and 47c. Similarly, a modified bearing support member 50' is provided that does not include any of the recesses 55 or the retainers 56a, 56b, and 56c. Thus, in this second embodiment of the center bearing assembly 20', movement of the modified bearing support member 50' relative to the modified bracket 40' is not limited to pivoting movement about an axis. Rather, the modified bearing support member 50' is capable of moving relative to the modified bracket 40' in any direction, being limited only by the engagement of the curved outer surface 54 of the modified bearing support member 46' with the curved inner surface 45 of the body portion 41 of the modified bracket 40'. In this second embodiment of the center bearing assembly 20', a conventional retainer (not shown) may be provided to positively retain the modified bearing support member 50' within the modified bracket 40' prior to installation on the support surface 22. The structure and manner of operation of the second embodiment of the center bearing assembly 20' is otherwise the same as described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A bearing assembly comprising:
   a bearing;
   a bearing support member supporting said bearing, said bearing support member having an outer surface; and
   a bracket supporting said bearing support member, said bracket having an inner surface that cooperates with said outer surface of said bearing support member;
   a recess provided on one of said bearing support member and said bracket; and
   a protrusion provided on the other of said bearing support member and said bracket that cooperates with said recess to allow said bearing support member to pivot relative to said bracket about an axis defined by said protrusion.

2. The bearing assembly defined in claim 1 wherein said outer surface of said bearing support member and said inner surface of said bracket are generally spherically shaped.

3. The bearing assembly defined in claim 1 wherein said bearing support member has a pair of opposed recesses provided thereon, and wherein said bracket has a pair of opposed protrusions provided thereon that respectively cooperate with said pair of recesses provided on said bearing support member such that said bearing support member can pivot relative to said bracket.

4. The bearing assembly defined in claim 1 wherein said bearing support member has a retainer provided thereon, and wherein said bracket has a slot provided thereon that cooperates with said retainer provided on said bearing support member to retain said bearing support member on said bracket.

5. The bearing assembly defined in claim 1 wherein said bearing support member has a plurality of retainers provided thereon, and wherein said bracket has a plurality of slots provided thereon that respectively cooperate with said plurality of retainers provided on said bearing support member to retain said bearing support member on said bracket.

6. The bearing assembly defined in claim 1 wherein said inner surface of said bracket and said outer surface of said bearing support member have generally the same shape.

7. The bearing assembly defined in claim 1 wherein said inner surface of said bracket and said outer surface of said bearing support member have different shapes.

8. The bearing assembly defined in claim 1 wherein said bearing defines an axis, and wherein said inner surface of said bracket cooperates with said outer surface of said bearing support member to allow said axis defined by said bearing to pivot relative to said bracket.

9. A driveshaft assembly comprising:
a driveshaft; and
a bearing assembly including a bearing that rotatably supports said driveshaft; a bearing support member supporting said bearing, said bearing support member having an outer surface; and a bracket supporting said bearing support member, said bracket having an inner surface that cooperates with said outer surface of said bearing support member;
a recess provided on one of said bearing support member and said bracket; and
a protrusion provided on the other of said bearing support member and said bracket that cooperates with said recess to allow said bearing support member to pivot relative to said bracket about an axis defined by said protrusion.

10. The driveshaft assembly defined in claim 9 wherein said outer surface of said bearing support member and said inner surface of said bracket are generally spherically shaped.

11. The driveshaft assembly defined in claim 9 wherein said bearing support member has a pair of opposed recesses provided thereon, and wherein said bracket has a pair of opposed protrusions provided thereon that respectively cooperate with said pair of recesses provided on said bearing support member such that said bearing support member can pivot relative to said bracket.

12. The driveshaft assembly defined in claim 9 wherein said bearing support member has a retainer provided thereon, and wherein said bracket has a slot provided thereon that cooperates with said retainer provided on said bearing support member to retain said bearing support member on said bracket.

13. The driveshaft assembly defined in claim 9 wherein said bearing support member has a plurality of retainers provided thereon, and wherein said bracket has a plurality of slots provided thereon that respectively cooperate with said plurality of retainers provided on said bearing support member to retain said bearing support member on said bracket.

14. The driveshaft assembly defined in claim 9 wherein said inner surface of said bracket and said outer surface of said bearing support member have generally the same shape.

15. The driveshaft assembly defined in claim 9 wherein said inner surface of said bracket and said outer surface of said bearing support member have different shapes.

16. The bearing assembly defined in claim 9 wherein said bearing defines an axis, and wherein said inner surface of said bracket cooperates with said outer surface of said bearing support member to allow said axis defined by said bearing to pivot relative to said bracket.

17. A drive train system comprising:
a source of power;
a driven mechanism; and
a driveshaft assembly connecting said source of power to said driven mechanism, said driveshaft assembly including a driveshaft and a bearing assembly including a bearing that rotatably supports said driveshaft; a bearing support member supporting said bearing, said bearing support member having an outer surface; and a bracket supporting said bearing support member, said bracket having an inner surface that cooperates with said outer surface of said bearing support member; a recess provided on one of said bearing support member and said bracket; and a protrusion provided on the other of said bearing support member and said bracket that cooperates with said recess to allow said bearing support member to pivot relative to said bracket about an axis defined by said protrusion.

18. The bearing assembly defined in claim 17 wherein said bearing defines an axis, and wherein said inner surface of said bracket cooperates with said outer surface of said bearing support member to allow said axis defined by said bearing to pivot relative to said bracket.

* * * * *